United States Patent [19]

Tamagaki

[11] Patent Number: 4,594,536
[45] Date of Patent: Jun. 10, 1986

[54] SERVOMOTOR SPEED CONTROL IN A POSITIONING DEVICE

[75] Inventor: Akira Tamagaki, Kyoto, Japan

[73] Assignee: Sharp Kabushiki Kaisha, Osaka, Japan

[21] Appl. No.: 630,265

[22] Filed: Jul. 12, 1984

[30] Foreign Application Priority Data

Jul. 15, 1983 [JP] Japan ............................ 58-129955

[51] Int. Cl.$^4$ ............................................. G05B 13/00
[52] U.S. Cl. .................................. 318/561; 318/594; 318/615
[58] Field of Search ............... 318/561, 594, 592, 615, 318/616, 617

[56] References Cited

U.S. PATENT DOCUMENTS

| 4,229,684 | 10/1980 | Saglini et al. | 318/561 |
| 4,355,273 | 10/1982 | DuVall | 318/561 |
| 4,459,525 | 7/1984 | Hasegawa | 318/561 |
| 4,486,693 | 12/1984 | Hamati et al. | 318/561 |

Primary Examiner—B. Dobeck
Attorney, Agent, or Firm—Birch, Stewart, Kolasch & Birch

[57] ABSTRACT

A servomotor speed control system includes a ROM table which stores a minimum distance suited for each motor speed. When the minimum distance corresponding to the current motor speed becomes shorter than the current distance from the current motor position to a positioning target point, the instructed speed is reduced to decelerate the servomotor rotation. In a preferred form, the unit of the distance is identical with an interval of a position indicating signal developed from a rotary encoder associated with the servomotor.

8 Claims, 9 Drawing Figures

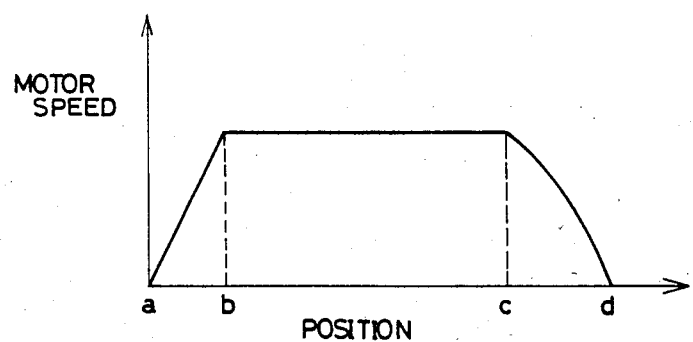
FIG. 1
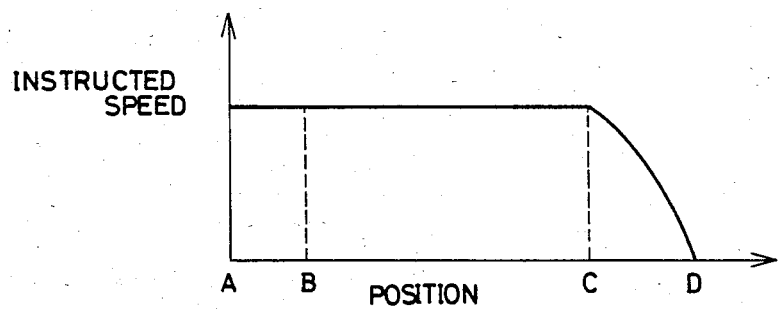
FIG. 2
| S | 0 | 1 | 2 | 3 | 4 | 5 | 6 | 7 | 8 | 9 | 10 | 11 | 12 | 13 |
|---|---|---|---|---|---|---|---|---|---|---|----|----|----|----|
| V | 0 | 2 | 3 | 3 | 4 | 4 | 5 | 5 | 6 | 6 | 6  | 7  | 7  | 7  |
| S | 14 | 15 | 16 | 17 | 18 | 19 | 20 | 21 | 22 | 23 | — | — | — | — |
|---|----|----|----|----|----|----|----|----|----|----|---|---|---|---|
| V | 7  | 8  | 8  | 8  | 8  | 9  | 9  | 9  | 9  | 10 | — | — | — | — |
FIG. 3

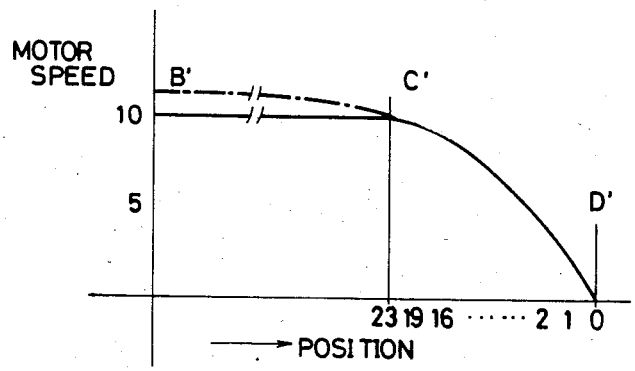
FIG. 4
| SPEED | 10 | 9 | 8 | 7 | 6 | 5 | 4 | 3 | 2 | 1 | 0 |
|---|---|---|---|---|---|---|---|---|---|---|---|
| MINIMUM DISTANCE | 23 | 19 | 16 | 11 | 8 | 6 | 4 | 2 | 1 | 0 | 0 |
FIG. 5
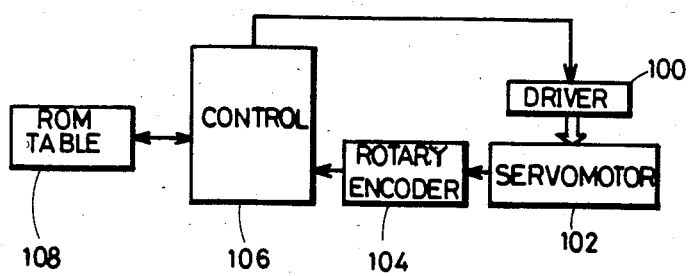
FIG. 6

SERVOMOTOR SPEED CONTROL IN A POSITIONING DEVICE

BACKGROUND OF THE INVENTION

1. [Field of the Invention]

The present invention relates to a positioning device including a servomotor and, more particularly, to a servomotor speed control system in a positioning device included in, for example, a type wheel positioning system in a printer, a carriage positioning system in a printer, or a machine tool.

2. [Description of the Prior Art]

In a positioning device, a servomotor is normally held in a halt state at a predetermined position. When a positioning commmand is applied to the positioning device, the servomotor is accelerated to the maximum speed, and rotates at the maximum constant speed toward a target point. When the servomotor position becomes close to the target point, the servomotor is decelerated so that the motor rotation is stopped precisely at the target point. That is, the servomotor speed must be controlled with reference to the distance between the current motor position and the target point. A preferred motor speed V is determined in accordance with the following formula.

$$V = a\sqrt{S}$$

where, a is a constant determined by the motor characteristics and the load connected to the servomotor, and S is the distance between the current motor position and the target point.

In a conventional system, an arithmetic calculation circuit is employed in a positioning device, which calculates a preferred motor speed upon every detection of the current motor position. The calculation can not track the high speed rotation because of the complicated radical operation.

In order to accurately track the high speed rotation, another positioning device is proposed, wherein a ROM table is provided in a control system for determining a preferred motor speed. In this system, the ROM table stores a preferred motor speed for each of the distance between the current motor position and the target point. The distance is scaled to correspond to the unit of the position detection output developed from the position detection device. Therefore, a considerably large capacity is required for the ROM table.

OBJECTS AND SUMMARY OF THE INVENTION

Accordingly, an object of the present invention is to provide a servomotor speed control system which tracks a high speed rotation of the servomotor.

Another object of the present invention is to provide a servomotor speed control system which is effective for presicely positioning the servomotor at a target point.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a ROM table is provided for determining the motor speed in accordance with the distance between the current motor position and the target point. The ROM table includes the memory sections corresponding to the degree of the motor speed. More specifically, if the motor speed is controlled by different ten levels, the ROM table includes ten memory sections. Each of the memory sections stores the minimum distance between the current position and the target point, where the servomotor should be rotated at the speed specified by one of the ten levels. In this way, the memory capacity of the ROM table is considerably reduced as compared with the conventional ROM table. Further, the system ensures a high speed rotation because a complicated calculation is not required.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a graph showing an example of a servomotor speed variation in a positioning device;

FIG. 2 is a graph showing a speed instruction for conducting the motor rotation of FIG. 1;

FIG. 3 is a chart showing a speed determining table of the prior art;

FIG. 4 is a graph showing a decelerating operation of the servomotor in a positioning device;

FIG. 5 is a chart showing an embodiment of a speed determining table included in a positioning system of the present invention;

FIG. 6 is a block diagram of an embodiment of a positioning device of the present invention;

FIG. 9 is a schematic representation of operative aspects of the control 106 of FIG. 6.

DESCRIPTION OF THE PREFERRED EMBODIMENTS

Figure 7:
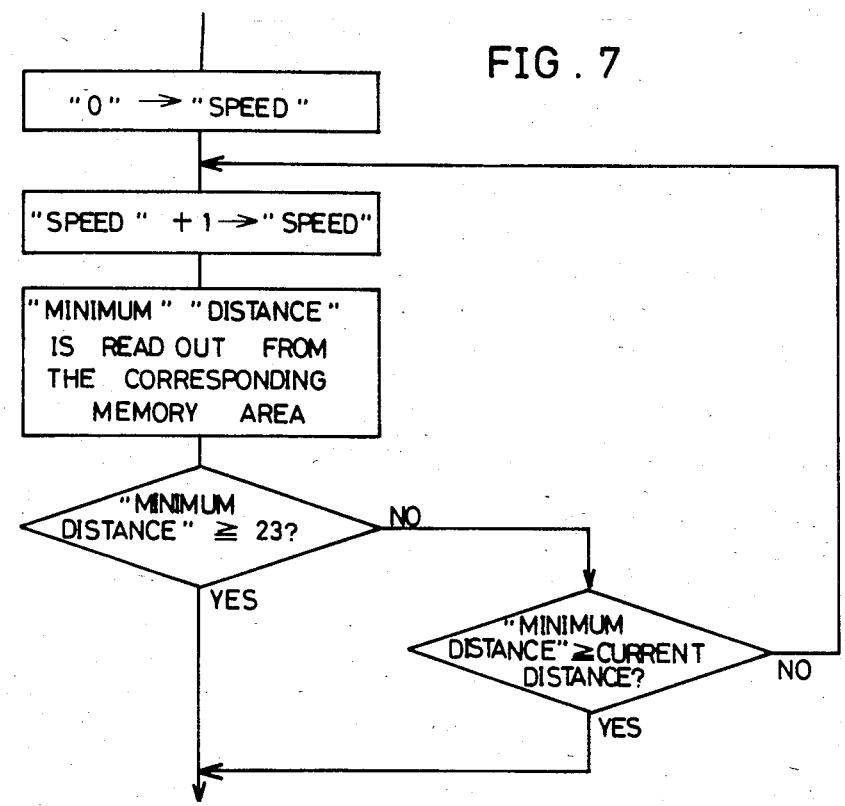
FIG. 7 is a flow chart for explaining an accelerating operation conducted by the positioning device of FIG. 6.

Generally, the servomotor must perform the rotation in a manner as shown in FIG. 1 so as to precisely stop at a target point. More specifically, the servomotor is accelerated from a halt state a and reaches the maximum constant speed at a point b. The maximum constant speed is maintained till the servomotor reaches a point c close to a target point d. When the servomotor reaches the point c, the servomotor is decelerated so as to precisely stop at the target point d. During the decelerating operation, a detailed speed control is required.

In order to rotate the servomotor in a manner as shown in FIG. 1, a speed instruction is conducted in a manner as shown in FIG. 2. That is, the maximum speed is instructed from the beginning of the motor rotation till the servomotor reaches the point c. When the maximum speed instruction is applied to the servomotor held in the halt state a (point A in FIG. 2), the servomotor is accelerated in accordance with the motor torque and the load connected to the servomotor. The servomotor reaches the maximum speed at a point B (corresponding to the point b in FIG. 1), and the maximum speed instruction is maintained till the servomotor reaches the point c (point C in FIG. 2). Then, the speed instruction is gradually reduced toward the target point D. The actual motor speed is gradually reduced in accordance with the reduction of the instructed speed.

Normally, the decelerating operation is conducted with reference to the distance between the current motor position and the target point. The motor speed V is preferably determined in accordance with the following equation.

$$V = a\sqrt{S}$$

where a is a constant determined by the motor characteristic and the load value, and S is the distance from the current motor position to the target point.

If the arithmetic calculation is conducted in the system, the system can not track a high speed rotation of the servomotor because of the complicated radical operation. To ensure an accurate control even at a high speed rotation, a ROM table control has been proposed, wherein a desired speed is read out from the ROM table upon every determination of the current motor position.

FIG. 3 shows a conventional ROM table wherein a desired motor speed is determined in accordance with the following equation.

$$V = 2\sqrt{S}$$

If the distance between the current motor position and the target point is "23", the instructed speed is "10" (maximum). When an output signal is obtained from the rotary encoder associated with the servomotor, the distance is reduced by one, and the desired speed "9" is read out from the memory area corresponding to the distance "22".

The ROM table method ensures a high speed operation because a complicated calculation is not required. In the ROM table of FIG. 3, the memory areas must be provided for each of the distances between the points C and D ("23" to "0"). Therefore, the conventional ROM table must have a large capacity. More apecifically, if the desired speed is shown by one byte digital data, the ROM table must have the memory capacity of several hundreds bytes.

As already discussed above, the desired motor speed should be determined in accordance with the equation ($V = a\sqrt{S}$). Even when the speed is instructed in accordance with the above equation, the maximum motor speed is limited as shown by the solid line in FIG. 4 due to the motor torque and the load connected to the motor. This means that it is practical to limit the speed instruction to "10" before the servomotor reaches the point C (C' in FIG. 4, the distance is "23").

FIG. 5 shows an embodiment of a ROM table included in the speed control system of the present invention. The memory areas are provided by the number corresponding to the different speed values, that is eleven. The table of FIG. 5 is based on the equation ($V = 2\sqrt{S}$). Each memory area stores the minimum distance where the motor speed should be controlled to the corresponding value. More specifically, when the distance from the current motor position to the target point is greater than or equal to "23", the motor speed should be "10". When the distance becomes less than "23" but is greater than or equal to "19", the motor speed should be "9".

FIG. 6 shows an embodiment of a positioning device having the ROM table of FIG. 5. A servomotor driver circuit 100 is connected to a servomotor 102 to control the motor speed and to perform the positioning operation. A rotary encoder 104 is associated with the servomotor 102, which develops a position indicating signal in response to the rotation of the servomotor 102. A main control circuit 106 receives the position indicating signal from the rotary encoder 104 and reads out the instruction speed from a ROM speed table 108, thereby developing a speed instruction signal toward the servomotor driver circuit 100 in accordance with the current motor position. The operation of the main control circuit 106 as described hereinafter is illustrated in greater detail in FIG. 9.

First, when the positioning command is applied to the system, the servomotor is accelerated in accordance with the flow of FIG. 7. More specifically, the speed value "0" is first introduced into the main control 106 which functions to add "1" to the speed value "0", and to read out the minimum distance "0" from the corresponding memory area of the ROM speed table 108. The thus read out minimum distance "0" is compared with the actual distance between the current motor position and the target point. Since the actual distance is longer than the minimum distance stored in the ROM speed table, the speed value is increased to "2". Then, the ROM table is addressed to read out the minimum distance "1" corresponding to the speed "2". Then, a determination is carried out whether the actual distance is longer than the minimum distance "1" now read out from the ROM speed table. In this way, the speed value is increased till the actual distance becomes longer than the minimum distance read out from the ROM speed table, or till the minimum distance read out from the ROM speed table becomes "23". That is, in the normal case, the initial speed is set at the maximum value "10". While the determination of FIg. 7 is conducted, the servomotor is held stationary. Thereafter, the start signal with the speed of "10" is normally applied to the servomotor driver circuit 100 to accelerate the servomotor 102.

Figure 8:
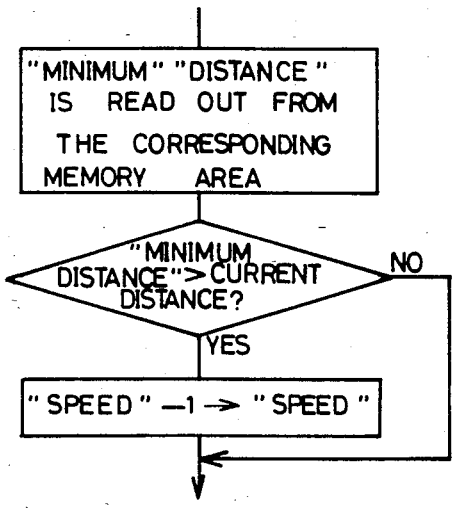
FIG. 8 is a flow chart for explaining a decelerating operation conducted by; and the positioning device of FIG. 6.

When the servomotor rotates, a speed control is conducted in accordance with a determination of the flow shown in FIG. 8. The determination of FIG. 8 is conducted upon every development of the position indicating signal from the rotary encoder 104. As already discussed above, the maximum speed "10" is maintained before the servomotor reaches the point C' which is separated from the target point D' by the distance "23". The unit of the distance corresponds to the interval of the development of the position indicating signal from the rotary encoder 104.

Now assume that the current distance is "23", and the servomotor speed is "10". Under these conditions when the detection output is applied from the rotary encoder 104 to the main control 106, the current distance is reduced by one to "22". The thus obtained current distance "22" is compared with the minimum distance "23" stored in the memory area corresponding to the motor apeed "10". Since the current distance "22" is shorter than the minimum distance "23" suited for the speed "10", the speed is reduced by one to "9". The servomotor is decelerated to the speed value "9". When the next detection output is applied from the rotary encoder 104 to the main control circuit 106, the current distance is reduced to "21". The current distance "21" is compared with the minimum distance "19" stored at the memory area corresponding to the speed "9". Since the current distance "21" is longer than the minimum distance "19", the instruction speed "9" is not changed. In this way, the servomotor rotation is decelerated with reference to the ROM speed table 108. The ROM speed table 108 is required to have eleven memory areas, the ROM capacity is several tens bytes.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A positioning device for positioning a servomotor comprising:
    current position detection means associated with the servomotor for developing a detection output in response to the rotation of the servomotor;
    current distance determination means for determining the current distance from the current motor position to a target point in accordance with said detection output developed from said current position detection means;
    a ROM speed table storing a minimum distance to said target for each of a plurality of different speed values;
    read out means for reading out said minimum distance from a selected memory area in said ROM speed table corresponding to the current motor speed;
    comparing means for comparing said minimum distance read out by said read out means with said current distance determined by said current distance detection means; and
    speed control means for reducing the speed of said servomotor when said comparing means determines that said current distance is shorter than said minimum distance.

2. The positioning device for positioning a servomotor of claim 1, wherein said current position detection means includes a rotary encoder associated with said servomotor.

3. The positioning device for positioning a servomotor of claim 1, wherein said ROM speed table stores minimum distances for each of eleven different speeds of discrete values.

4. A positioning device for positioning a servomotor at a target location comprising:
    current position detection means associated with the servomotor for detecting rotation of the servomotor and developing a detection output related thereto;
    a memory speed table storing a minimum distance to the target location for each of a plurality of motor speed values representative each representative of a motor drive speed;
    speed control means for determining the current distance from the current position of said servomotor to said target position, for reading out the minimum distance associated with a current motor speed value from said memory speed table, for comparing said minimum distance read out by said read out means with said current distance, and for reducing the current motor speed value when said current distance is less than said minimum distance; and
    means, responsive to said speed control means, for driving said motor at a speed determined by said current motor speed value.

5. The positioning device for positioning a servomotor of claim 4, wherein said current position detection means includes a rotary encoder associated with said servomotor.

6. The positioning device for positioning a servomotor of claim 4 wherein said memory speed table stores minimum distances for each of eleven different speeds of discrete values.

7. The positioning device for positioning a servomotor of claim 4 wherein the unit of distance used in said memory speed table equals a multiple of the intervals developed by said rotary encoder.

8. A method of positioning a servomotor at a target location comprising:
    (a) determining the current position of said servomotor;
    (b) determining the current distance between said current position and said target location;
    (c) reading out the minimum distance to said target location at which said servomotor should be moving at its current speed from a memory speed table, said current motor speed being used to access said minimum distance from memory; and
    (d) reducing motor speed when said current distance is less than said minimum distance;
    (e) repeating steps a-d until said target location is reached.

* * * * *